(12) United States Patent
Tujkovic et al.

(10) Patent No.: US 7,783,293 B2
(45) Date of Patent: Aug. 24, 2010

(54) METHOD OF TRAINING A COMMUNICATION SYSTEM

(75) Inventors: Djordje Tujkovic, Santa Clara, CA (US); Louay Jalloul, Santa Clara, CA (US); Sam P. Alex, Santa Clara, CA (US); Javvadi Varaprasad, Santa Clara, CA (US)

(73) Assignee: BECEEM Communications Inc., Santa Clara, CA (US)

( * ) Notice: Subject to any disclaimer, the term of this patent is extended or adjusted under 35 U.S.C. 154(b) by 133 days.

(21) Appl. No.: 11/796,497

(22) Filed: Apr. 26, 2007

(65) Prior Publication Data

US 2007/0254655 A1    Nov. 1, 2007

Related U.S. Application Data

(60) Provisional application No. 60/795,107, filed on Apr. 26, 2006.

(51) Int. Cl.
*H04W 72/00* (2009.01)
*H04B 1/38* (2006.01)
*H04M 1/00* (2006.01)
*H04W 4/00* (2009.01)

(52) U.S. Cl. ............... 455/450; 455/561; 455/562.1; 455/452.1; 370/329; 370/332; 370/334

(58) Field of Classification Search ........... 455/561, 455/562.1, 575.7, 450, 452.1, 452.2; 370/329, 370/330, 332, 334
See application file for complete search history.

(56) References Cited

U.S. PATENT DOCUMENTS

| | | | |
|---|---|---|---|
| 6,771,706 B2 | 8/2004 | Ling et al. | 375/267 |
| 7,308,035 B2 * | 12/2007 | Rouquette et al. | 375/267 |
| 7,379,749 B2 * | 5/2008 | Doi et al. | 455/525 |
| 2005/0002468 A1 | 1/2005 | Walton et al. | 375/267 |
| 2005/0018597 A1 * | 1/2005 | Yuda et al. | 370/208 |
| 2005/0265290 A1 | 12/2005 | Hochwald et al. | 370/335 |
| 2007/0064823 A1 | 3/2007 | Hwang et al. | 375/260 |
| 2007/0066230 A1 | 3/2007 | Zhang et al. | 455/67.11 |
| 2007/0173208 A1 | 7/2007 | Nishio et al. | |

* cited by examiner

*Primary Examiner*—Un C Cho
(74) *Attorney, Agent, or Firm*—Brian R. Short

(57) ABSTRACT

A method and system of training a communication system is disclosed. The method includes a first transceiver transmitting signals through one or more antennas of the first transceiver. A second transceiver selects a subset of a plurality of antennas of the second transceiver, wherein the selected subset provides a largest aggregate received signal power. The second transceiver transmits pilots on a subset of sub-carriers of multi-carrier signals through the selected subset of the plurality of antennas of the second transceiver. The first transceiver receives the pilots, and extracts channel knowledge from the received pilots.

20 Claims, 6 Drawing Sheets

```
┌─────────────────────────────────────────────────────────────────┐
│ A first transceiver transmitting signals through one or more    │
│ antennas of the first transceiver                               │
│                                                                 │
│                              210                                │
└─────────────────────────────────────────────────────────────────┘
                                │
                                ▼
┌─────────────────────────────────────────────────────────────────┐
│ A second transceiver selecting a subset of a plurality of       │
│ antennas of the second transceiver, the selected subset         │
│ providing a largest aggregate received signal power             │
│                                                                 │
│                              220                                │
└─────────────────────────────────────────────────────────────────┘
                                │
                                ▼
┌─────────────────────────────────────────────────────────────────┐
│ The second transceiver transmitting pilots on sub-carriers of   │
│ OFDM signals through the selected subset of the plurality of    │
│ antennas of the second transceiver                              │
│                                                                 │
│                              230                                │
└─────────────────────────────────────────────────────────────────┘
                                │
                                ▼
┌─────────────────────────────────────────────────────────────────┐
│ The first transceiver receiving the pilots                      │
│                                                                 │
│                              240                                │
└─────────────────────────────────────────────────────────────────┘
                                │
                                ▼
┌─────────────────────────────────────────────────────────────────┐
│ The first transceiver extracting channel knowledge from the     │
│ received pilots                                                 │
│                                                                 │
│                              250                                │
└─────────────────────────────────────────────────────────────────┘
```

FIGURE 2

```
┌─────────────────────────────────────────────────────────┐
│ A first transceiver transmitting signals through one or │
│ more antennas of the first transceiver                  │
│                                                         │
│                         410                             │
└─────────────────────────────────────────────────────────┘
                             │
                             ▼
┌─────────────────────────────────────────────────────────┐
│ A second transceiver selecting a subset of a plurality  │
│ of antennas of the second transceiver, the selected     │
│ subset providing a highest quality received signal      │
│                                                         │
│                         420                             │
└─────────────────────────────────────────────────────────┘
                             │
                             ▼
┌─────────────────────────────────────────────────────────┐
│ The second transceiver transmitting training signals    │
│ through the selected subset of the plurality of         │
│ antennas of the second transceiver                      │
│                                                         │
│                         430                             │
└─────────────────────────────────────────────────────────┘
                             │
                             ▼
┌─────────────────────────────────────────────────────────┐
│ The first transceiver receiving the training signals    │
│                                                         │
│                         440                             │
└─────────────────────────────────────────────────────────┘
                             │
                             ▼
┌─────────────────────────────────────────────────────────┐
│ The first transceiver extracting channel knowledge      │
│ from the received training signals                      │
│                                                         │
│                         450                             │
└─────────────────────────────────────────────────────────┘
```

FIGURE 4

METHOD OF TRAINING A COMMUNICATION SYSTEM

CROSS-REFERENCE TO RELATED APPLICATION

This application claims the benefit of U.S. Provisional Application Patent Application No. 60/795,107 filed Apr. 26, 2006 which is incorporated be reference in its entirety herein.

FIELD OF EMBODIMENTS

The described embodiments relate generally to wireless communication networks and more specifically to methods of training a communication system.

BACKGROUND

Wireless networks are gaining popularity because wireless infrastructures are typically easier and less expensive to deploy than wired networks. However, wireless networks can be susceptible to environmental conditions, interference and self-interference. A popular wireless network implementation uses base stations that communicate with wireless user devices that are located within cells formed by the base stations.

Some wireless networks utilize multiple antennas for both base station and subscriber station for improving data transmission capacity, and/or reducing noise resulting from interference from unwanted transmitters. Multiple antenna transmission techniques, such as, spatial multiplexing and beam forming, typically need knowledge of the channel conditions at the base station.

Mobile wireless devices introduce additional problems because the transmission channel between a based station and a mobile device is constantly changing. The transmission channels between the base stations and the mobile devices are constantly changing. As a result, the channel conditions of the transmission channels are constantly changing, making it more difficult to maintain current channel conditions.

There is a need for method and system for determining channel information in multiple antenna system in which users (subscribers) are mobile.

SUMMARY

A first embodiment includes a method of training a communication system. The method includes a first transceiver transmitting signals through one or more antennas of the first transceiver. A second transceiver selects a subset of a plurality of antennas of the second transceiver, wherein the selected subset provides a largest aggregate received signal power. The second transceiver transmits pilots on a subset of sub-carriers of multi-carrier signals through the selected subset of the plurality of antennas of the second transceiver. The first transceiver receives the pilots, and extracts channel knowledge from the received pilots.

A second embodiment is similar to the first embodiment, but includes the second transceiver selects the subset of a plurality of antennas of the second transceiver that provide a highest quality received signal.

Another embodiment includes a WiMAX base station characterizing a transmission channel. The method includes the WiMAX base station transmitting OFDM signals through one or more antennas of the base station. A subscriber selects one of a plurality of antennas of the subscriber that provides a largest aggregate received signal power. The subscriber transmits pilots on sub-carriers of OFDM signals through the selected antenna of the plurality of antennas of the subscriber. The base station receives the pilots; and extracts channel knowledge from the pilots.

BRIEF DESCRIPTION OF DRAWINGS

A more complete appreciation of the described embodiments is provided by reference to the following detailed description when considered in conjunction with the accompanying drawings in which reference symbols indicate the same or similar components, wherein

FIG. 2 is a flow chart that includes one example of steps of a method of training a communication system.

FIG. 4 is a flow chart that includes one example of steps of another method of training a communication system.

DETAILED DESCRIPTION

Figure 1:
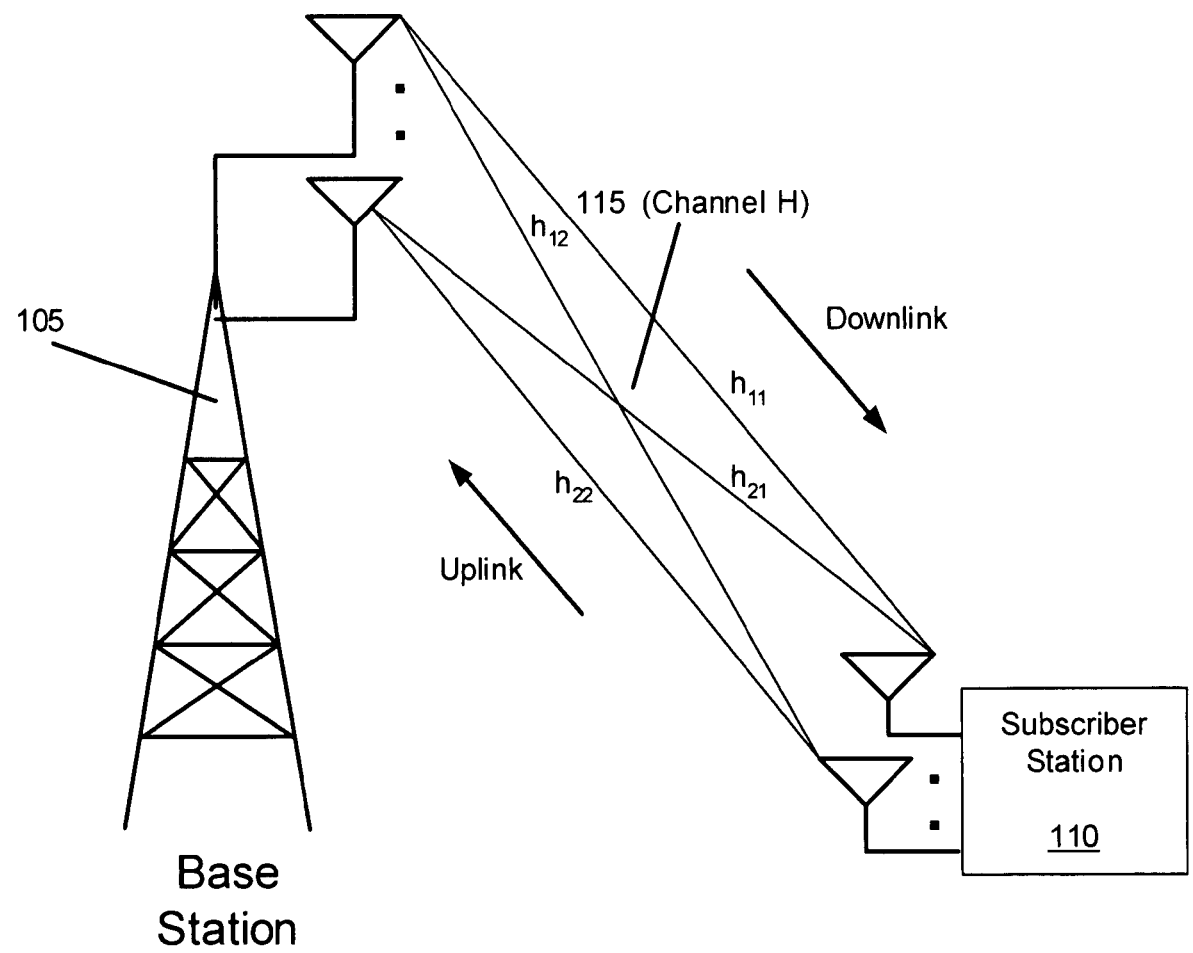
FIG. 1 illustrates an example of a wireless communication system that includes a pair of multiple antenna transceivers that embodiments of the methods of training a multiple antenna receiver are operable.

Before describing embodiments, it is to be observed that the embodiments reside primarily in combinations of method steps and apparatus components related to a method and system for facilitating adaptive training of wireless communication systems. The adaptive training can be particularly useful in systems that include mobile users. Additionally, the adaptive training can reduce uplink data transmission, and provide a current estimate of conditions of a downlink channel Accordingly, the apparatus components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

The wireless communication system can comprise a plurality of subscriber stations, such as mobile phones, personal computers, laptops or personal digital assistants (PDAs), and a plurality of base stations. One or more subscriber stations can be located in a service area corresponding to a base station.

In a TDD (time domain duplex) wireless system the same frequency channel is typically used in both downlink (base station to subscriber) and in uplink (subscriber to base station) the reciprocal nature of the channel can be exploited by estimating the channel information at base station using the reverse link. That is, the base station can estimate the downlink channel based on channel characterizations of the uplink channel. For example, the subscriber can send training signals on a reverse dedicated probe channel, also known as a sounding channel. However, for multiple antenna systems (multiple antenna subscriber, and in some cases a multiple antenna base station), the subscriber generally does not know which of its multiple antennas it will be receiving down link transmission signals.

A base station may include one or more antenna elements. The one or more antenna elements can enable the base station to communicate with the one or more subscriber stations. Moreover, in an embodiment, a subscriber station includes a plurality of receive antenna elements. Those skilled in the art will realize that, using a plurality of receive antenna elements, a subscriber station can obtain multiple observations of a signal transmitted from transmitting station, such as a base station.

The base station communicates with a subscriber station on a forward link and the subscriber station communicates with the base station on a reverse link. As previously stated, in a TDD system, the forward link as well as the reverse link, use the same frequency and, consequently, approximately the same channel, although at different times.

FIG. 1 shows an example of a wireless communication system that includes a pair of multiple antenna transceivers (which can be a base station and a subscriber station) that the embodiments of the methods of training a multiple antenna receiver disclosed, are operable. An embodiment of the wireless communication system supports a TDD method of communication. The wireless communication system can also support other multiplexing technologies such as FDD. The wireless communication system can comprise a plurality of subscriber stations and a plurality of base stations. However, for illustrative purposes, only one base station, a base station 105, in communication with one subscriber station 110 are shown in FIG. 1. If the wireless communication system 100 supports TDD transmission, the base station 105 and the subscriber station 110 can communicate with each other over a single channel (H) 115. Channel 115 utilizes a same frequency for a forward link transmission as well as for a reverse link transmission.

Base station 105 includes one or more antenna elements. Further, in accordance with various embodiments, subscriber station 110 includes a plurality of receive antenna element. If, for example, the base station 105 has two transmit antennas and the subscriber station 110 has two receive antennas, then the channel H can be represented with a 2×2 matrix having elements $h_{11}$, $h_{12}$, $h_{21}$, $h_{22}$.

The base station 105 can communicate with subscriber station 110 by beamforming or spatial multiplexing using one or more of the plurality of antenna elements at base station 105. For multiple antenna transmission, the base station 105 requires channel knowledge of channel 115 between base station 105 and subscriber station 110. In accordance with an embodiment, subscriber station 110 transmits sounding signals on the uplink to the base station 105, to allow the base station to extract the channel knowledge of channel 115. As will be described, the sounding signal is transmitted over a selected subset of the antennas of the subscriber station 110. As stated previously, in an embodiment of a TDD method, a base station and a subscriber station communicate with each other over a common carrier frequency. So, channel knowledge extracted at the base station 105 over a reverse link (uplink) may be used by base station 105 for improving the transmission on the forward link (downlink).

FIG. 2 is a flow chart that includes one example of steps of a method of training a communication system. A first step 210 includes a first transceiver transmitting signals through one or more antennas of the first transceiver. A second step 220 includes a second transceiver selecting a subset of a plurality of antennas of the second transceiver, the selected subset providing a largest aggregate received signal power. A third step 230 includes the second transceiver transmitting pilots on sub-carriers of OFDM signals through the selected subset of the plurality of antennas of the second transceiver. A fourth step 240 includes the first transceiver receiving the pilots. A fifth step 250 includes the first transceiver extracting channel knowledge from the received pilots.

The first transceiver (which can be, for example, a base station) can transmit from one or more antennas. Multiple antenna transmission allows for support of spatial multiplexing and beam forming transmission to the second transceiver. However, these methods of transmission benefit from knowledge of the transmission channel between the transmitter and the receiver.

If, for example, the first and second transceivers communicate according to TDD, then the transmission channel from the first transceiver to the second transceiver can be estimated by characterization of the transmission channel from the second transceiver to the first transceiver. That is for TDD communication, the same carrier frequency is used for transmission in both directions. Therefore, if it is assumed that the channel characteristics are reciprocal in both directions of the transmission channel, then characterization of the transmission channel in one direction can be used to approximate the transmission channel in the other direction.

Once the second transceiver (which can be, for example, a subscriber station) has selected the subset of a plurality of antennas of the second transceiver, the selected subset providing a largest aggregate received signal power, the second transceiver transmits pilots on sub-carriers of OFDM signals through the selected subset of the plurality first transceiver of antennas of the second transceiver. The pilots are sounding signals that are transmitted on the link between the selected antennas of the second transceiver and the second transceiver. The selected antennas are the antennas that will receive signals from the first transceiver during multiple antenna transmission. Therefore, sending sounding signals over these antennas allows the first transceiver to extract channel knowledge that can be used for transmission from the first transceiver to the second transceiver.

The sounding signals include known pilot tones. Processing of the received signals (sounding signals) at the first transceiver based on the known pilot tones allows the transmission channel (H) to be estimated, or extracted.

Once the first transceiver has extracted the channel knowledge from the received pilots, the first transceiver can use the channel knowledge to aid transmission to the second receiver. More specifically, the first transceiver can preprocess a plurality of data streams based on the channel knowledge, and transmit the preprocessed plurality of data streams from the plurality of antennas of the first transceiver. For one embodiment, the plurality of data streams includes multiples of a common data stream, and the preprocessing provides beamforming transmission of the multiples of the common data stream. For another embodiment, the plurality of data streams includes a plurality of different data streams, and the preprocessing provides spatial multiplexing transmission of the different data streams.

An embodiment of the communication system includes a plurality of frequency sub-carriers. For one embodiment, the second transceiver transmits the pilots over all of the frequency sub-carriers. For another embodiment, the second transceiver transmits the pilots over a subset of the frequency sub-carriers.

An embodiment includes the second transceiver only transmitting the training signals if the transmission channel between the first and second transceiver is above a threshold level of quality. That is, for example, the second transceiver only transmits the pilots if the largest aggregate received signal power is greater than a threshold. This embodiment introduces a temporal element into the adaptive channel processing. More specifically, when the signal quality between the first transceiver and the second transceiver falls below a threshold, the sounding (pilot tones) are no longer transmitted.

The aggregate receive signal power is calculated on each of the plurality of receive antenna elements of the second transceiver. The aggregate receive signal power can be calculated using a preamble (as will be described later) obtained from the transmission signals received from the first transceiver. However, those skilled in the art will realize that other portions of transmission signals received from first transceiver can also be used for calculating the aggregate receive signal power. The second transceiver can select the plurality of favorable receive antenna elements as the receive antenna elements that have a larger aggregate receive signal power as given by;

$$\max_{i=1,2}(\|H_i\|^2), \text{ where } \|H_i\|^2 = \frac{1}{N}\sum_{j=1}^{N}\|H_{i,j}\|^2$$

where $(\|H_i\|^2)$ is the power on the i-th antenna, $|H_{i,j}|^2$ is the power of the j-th sub-carrier of the i-th antenna, and N is the number of sub-carrier (for example, N=1024 for a 10 MHz channel).

Other embodiments of sub-carrier signals include PUSC and BAMC multi-carrier signals. These signals include only partial usage of the sub-carrier signals. PUSC spreads the sub-carrier providing a diversity of allocation of the sub-carriers across the multi-carrier frequency spectrum. BAMC provide sub-carrier allocations that are grouped into bands of the multi-carrier frequency spectrum. For partial sub-carrier usage signals, the aggregate power on the multiple receive antennas can be given as;

$$\max_{i=1,2}(\|H_i\|^2);$$

where $$\|H_i\|^2 = \frac{1}{M}\sum_{j=gM+1}^{(g+1)*M}\|H_{i,j}\|^2$$

where g represents the band, and M is the number of sub-carriers in a band.

Figure 3:
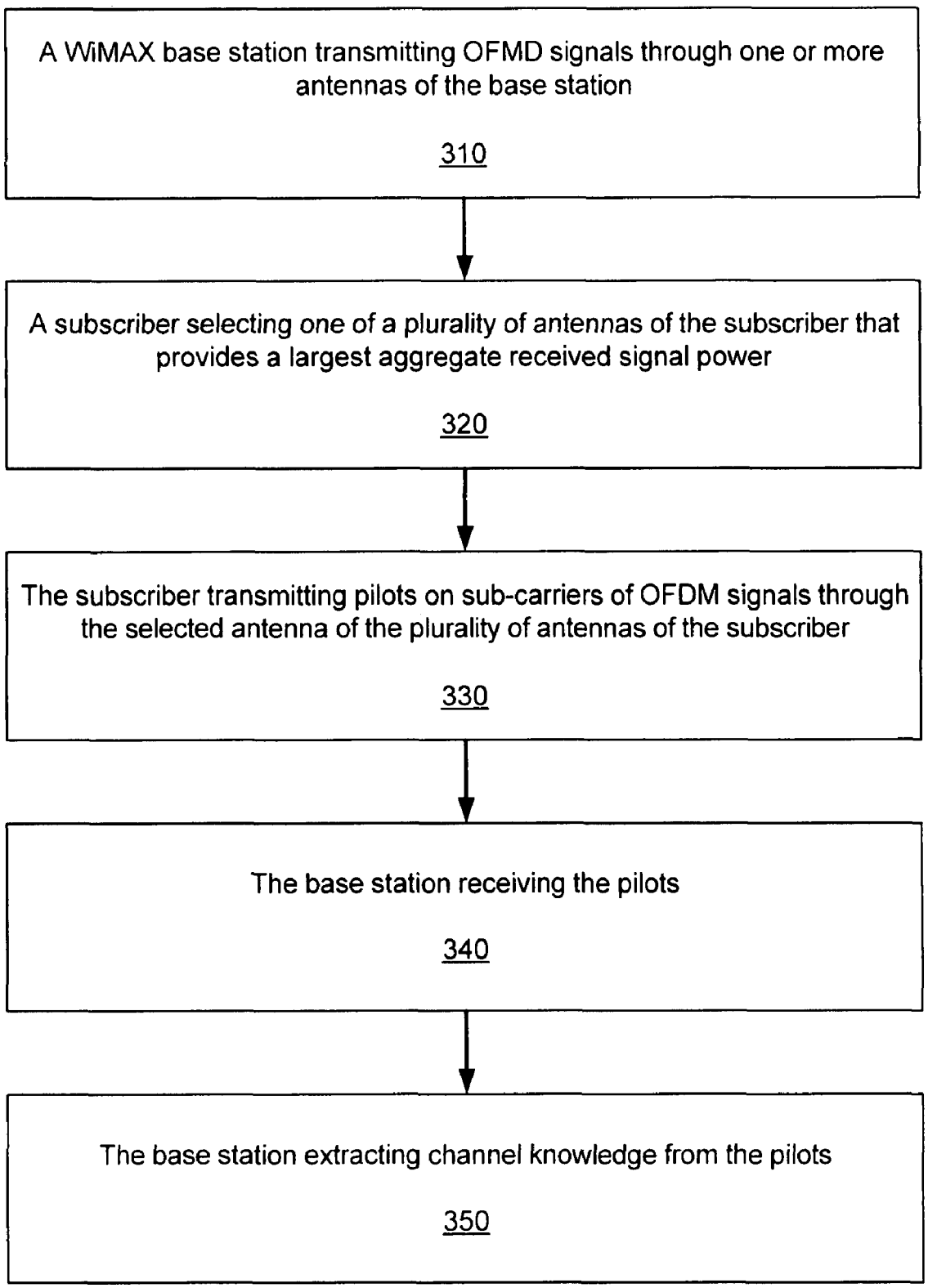
FIG. 3 is a flow chart that includes one example of steps of a method of a WiMAX base station characterizing a transmission channel.

FIG. 3 is a flow chart that includes one example of steps of a method of a WiMAX base station characterizing a transmission channel. A first step 310 includes the WiMAX base station transmitting OFMD signals through one or more antennas of the base station. A second step 320 includes a subscriber selecting one of a plurality of antennas of the subscriber that provides a largest aggregate received signal power. A third step 330 includes the subscriber transmitting pilots on sub-carriers of OFDM signals through the selected antenna of the plurality of antennas of the subscriber. A fourth step 340 includes the base station receiving the pilots. A fifth step 350 includes the base station extracting channel knowledge from the pilots.

An embodiment of the communication system includes a plurality of frequency sub-carriers. For one embodiment, the subscriber transmits the pilots over all of the frequency sub-carriers. For another embodiment, the subscriber transmits the pilots over a subset of the frequency sub-carriers.

An embodiment includes the subscriber only transmitting the training signals if the transmission channel between the base station and the subscriber is above a threshold level of quality. That is, for example, the subscriber only transmits the pilots if the largest aggregate received signal power is greater than a threshold.

FIG. 4 is a flow chart that includes one example of steps of another method of training a communication system. A first step 410 includes a first transceiver transmitting signals through one or more antennas of the first transceiver. A second step 420 includes a second transceiver selecting a subset of a plurality of antennas of the second transceiver, the selected subset providing a highest quality received signal. A third step 430 includes the second transceiver transmitting training signals through the selected subset of the plurality of antennas of the second transceiver. A fourth step 440 includes the first transceiver receiving the training signals. A fifth step 450 includes the first transceiver extracting channel knowledge from the received training signals.

For this embodiment, selecting the subset providing the highest receive signal quality comprises selecting the subset providing at least one of a greatest SNR, a greatest SINR, a lowest BER, a lowest PER, and lowest FER. That is, each combination of subsets of antennas can be tested for the list signal quality parameters.

An embodiment of the communication system includes a plurality of frequency sub-carriers. For one embodiment, the second transceiver transmits the pilots over all of the frequency sub-carriers. For another embodiment, the second transceiver transmits the pilots over a subset of the frequency sub-carriers. As will be described later, the pilots can be transmitted on a subset of sub-carriers of OFDM signals An embodiment includes the second transceiver only transmitting the training signals if the transmission channel between the first and second transceiver is above a threshold level of quality. That is, for example, the second transceiver only transmits the pilots if the largest aggregate received signal power is greater than a threshold.

Figure 5:
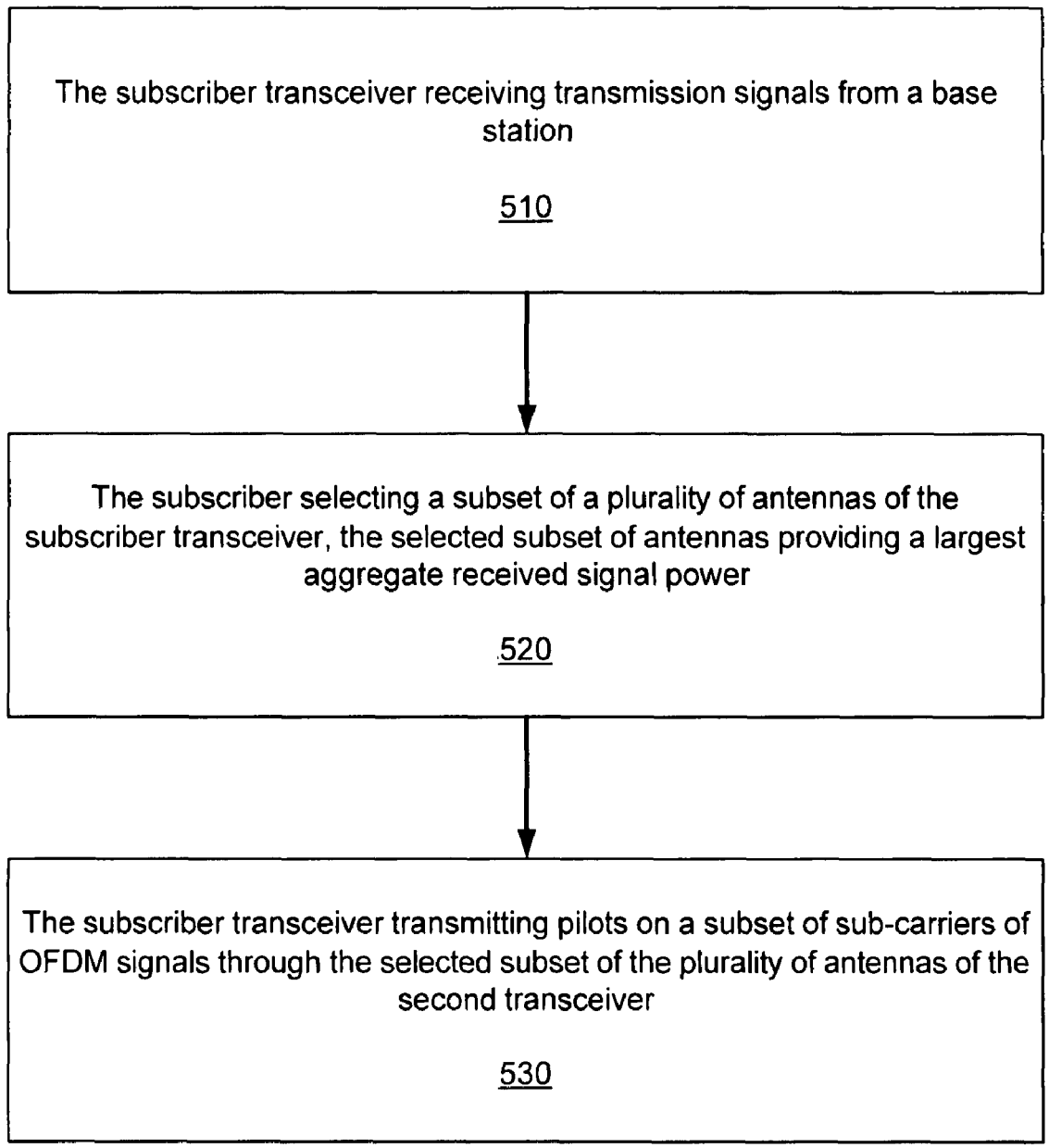
FIG. 5 is a flow chart that includes one example of steps of a method of a subscriber transceiver enabling training of a communication system

FIG. 5 is a flow chart that includes one example of steps of a method of a subscriber transceiver enabling training of a communication system. A first step 510 includes a subscriber transceiver receiving transmission signals from a base station. A second step 520 includes the subscriber selecting a subset of a plurality of antennas of the subscriber transceiver, the selected subset of antennas providing a largest aggregate received signal power. A third step 530 includes the subscriber transceiver transmitting pilots on a subset of sub-carriers of OFDM signals through the selected subset of the plurality of antennas of the second transceiver.

Figure 6:
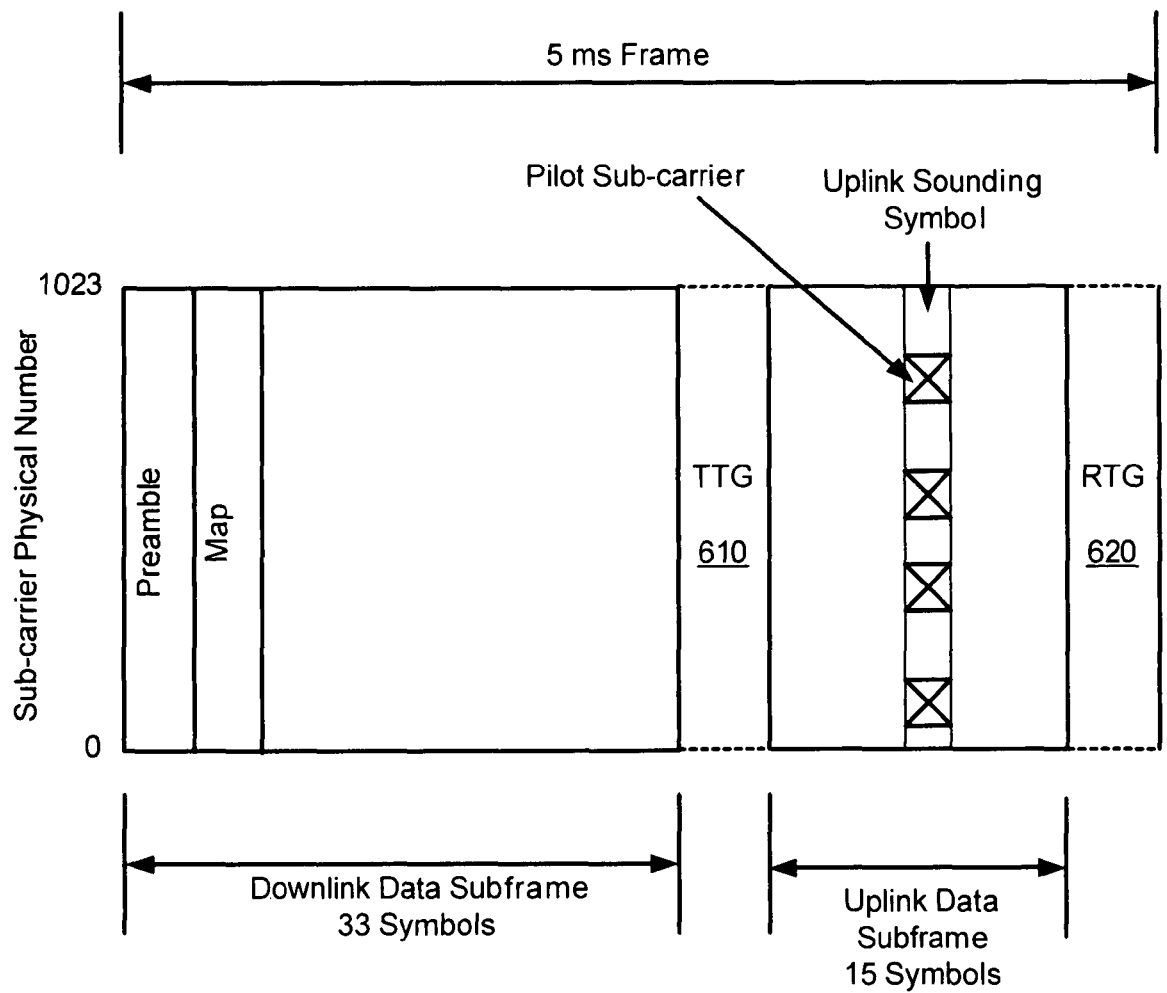
FIG. 6 shows an example of a WiMAX frame.

FIG. 6 shows an example of a WiMAX frame. As shown, the WiMAX frame includes within a downlink data sub-frame, a preamble, a map and data, and within an uplink data sub-frame, an uplink sounding symbol and data. The preamble includes a set of tones/sub-carriers to help the subscriber synchronize to the WiMAX network. The map provides the transceivers with a schedule of their transmissions. The uplink sounding symbol includes pilot sub-carriers transmitted by the subscriber that can be used by the base station to extract channel knowledge.

As shown, a TTG (Transmit to receive transition gap) 610 occurs after the downlink subframe, and a RTG (Receive to transmit transition gap) 620 occurs after the uplink subframe.

For one example of a WiMAX system, the downlink (DL) sub-frame includes 33 symbols and has a time duration of 3.428 milliseconds. The uplink (UL) sub-frame includes 15 symbols and has a time duration of 1.512 milliseconds. An exemplary TTG provides a guard time of 121.2 microseconds between the downlink sub-frame and the uplink sub-frame. An exemplary RTG provides a guard time of 40.4 microseconds between the uplink sub-frame and the downlink sub-frame.

As shown, there are 1024 OFDM sub-carrier within each symbol. All 1024, or a subset of the 1024 can be used for transmitting pilot tones over the uplink sounding symbol.

During the uplink data sub-frame, the sounding symbol is transmitted by the subscriber. The base station estimates or extracts the channel H during the uplink data sub-frame based on the sounding symbol. With the channel knowledge H the base station can apply multiple antenna weights to transmission signals, wherein the weights are based on the estimate of the channel. The application of the multiple antenna weights occurs during a multiple antenna zone within the downlink data sub-frame.

Although specific embodiments have been described and illustrated, the embodiments are not to be limited to the specific forms or arrangements of parts so described and illustrated.

What is claimed is:

1. A method of training a communication system, comprising:
   a first transceiver transmitting signals through one or more antennas of the first transceiver;
   a second transceiver calculating a largest aggregate received signal power based on measurements of receive powers over a plurality of antennas and multiple sub-carriers of the second transceiver;
   the second transceiver selecting a subset of the plurality of antennas of the second transceiver, the selected subset providing the largest aggregate received signals power;
   the second transceiver transmitting pilots on sub-carriers of OFDM signals through the selected subset of the plurality of antennas of the second transceiver;
   the first transceiver receiving the pilots; and
   the first transceiver extracting channel knowledge from the received pilots.

2. The method of claim 1, further comprising:
   the first transceiver preprocessing a plurality of data streams based on the channel knowledge;
   the first transceiver transmitting the preprocessed plurality of data streams from the plurality of antennas of the first transceiver.

3. The method of claim 2, wherein the plurality of data streams comprises multiples of a common data stream, and preprocessing provides beam-forming transmission of the multiples of the common data stream.

4. The method of claim 2, wherein the plurality of data streams comprises a plurality of different data streams, and preprocessing provides spatial multiplexing transmission of the different data streams.

5. The method of claim 1, wherein the communication system comprises a plurality of frequency sub-carriers.

6. The method of claim 5, wherein the second transceiver transmits the pilots over all of the frequency sub-carriers.

7. The method of claim 5, wherein the second transceiver transmits the pilots over a subset of the frequency sub-carriers.

8. The method of claim 1, wherein the second transceiver only transmits the pilots if the largest aggregate received signal power is greater than a threshold.

9. A method of a WiMAX base station characterizing a transmission channel, comprising:
   the WiMAX base station transmitting OFDM signals through one or more antennas of the base station;
   a subscriber calculating a largest aggregate received signal power based on measurements of received powers over a plurality of antennas and multiple sub-carriers of the subscriber;
   the subscriber selecting one of the plurality of antennas of the subscriber that provides the largest aggregate received signal power;
   the subscriber transmitting pilots on sub-carriers of OFDM signals through the selected antenna of the plurality of antennas of the subscriber;
   the base station receiving the pilots; and
   the base station extracting channel knowledge from the pilots.

10. The method of claim 9, wherein the channel comprises a plurality of frequency sub-carriers.

11. The method of claim 10, wherein the subscriber transmits the pilots over all of the frequency sub-carriers.

12. The method of claim 10, wherein the subscriber transmits the pilots over a subset of the frequency sub-carriers.

13. The method of claim 10, wherein the subscriber only transmits the pilots if the largest aggregate received signal power is greater than a threshold.

14. A method of training a communication system, comprising:
   a first transceiver transmitting signals through one or more antennas of the first transceiver;
   a second transceiver calculating a largest aggregate received signal power based on measurements of receive powers over a plurality of antennas and multiple sub-carriers of the second transceiver;
   the second transceiver calculating a highest quality received signal;
   the second transceiver selecting a subset of the plurality of antennas of the second transceiver, the selected subset providing the highest quality received signal;
   the second transceiver transmitting training signals on sub-carriers of OFDM signals through the selected subset of the plurality of antennas of the second transceiver;
   the first transceiver receiving the training signals; and
   the first transceiver extracting channel knowledge from the received training signals.

15. The method of claim 14, wherein selecting the subset providing the highest receive signal quality comprises selecting the subset providing at least one of a greatest SNR, a greatest SINR, a lowest BER, a lowest PER, and lowest FER.

16. The method of claim 14, wherein the communication system comprises a plurality of frequency sub-carriers.

17. The method of claim 16, wherein the second transceiver transmits the training signals over all of the frequency sub-carriers.

18. The method of claim 16, wherein the second transceiver transmits the training signals over a subset of the frequency sub-carriers.

19. The method of claim 14, wherein the second transceiver only transmits the training signals if the largest aggregate received signal power is greater than a threshold.

20. A method of a subscriber transceiver enabling training of a communication system, comprising:
   a subscriber transceiver receiving transmission signals froma base station;

the subscriber transceiver calculating a largest aggregate received signal power based on measurements of receive powers over a plurality of antennas and multiple sub-carriers of the second transceiver;

the subscriber transceiver selecting a subset of the plurality of antennas of the subscriber transceiver, the selected subset of antennas providing the largest aggregate received signal power;

the subscriber transceiver transmitting pilots on a subset of sub-carriers of OFDM signals through the selected subset of the plurality of antennas of the subscriber transceiver;

the base station receiving the pilots; and the base station extracting channel knowledge from the received pilots.

* * * * *